(12) United States Patent
Selvaraj et al.

(10) Patent No.: US 8,427,675 B2
(45) Date of Patent: Apr. 23, 2013

(54) AUTOMATICALLY UPDATING A PRINTER DRIVER WITH NEW PRINTING DEVICE FEATURES

(75) Inventors: Senthil Selvaraj, Snoqualmie, WA (US); Zhenning Xiao, Renton, WA (US)

(73) Assignee: Ricoh Company, Ltd., Tokyo (JP)

( * ) Notice: Subject to any disclaimer, the term of this patent is extended or adjusted under 35 U.S.C. 154(b) by 1123 days.

(21) Appl. No.: 12/360,794

(22) Filed: Jan. 27, 2009

(65) Prior Publication Data
US 2010/0188688 A1    Jul. 29, 2010

(51) Int. Cl.
*H04N 1/40* (2006.01)

(52) U.S. Cl.
USPC .......................................... 358/1.15; 358/468

(58) Field of Classification Search .................. 358/1.9, 358/2.1, 1.15, 1.18, 468, 400, 500, 406, 504
See application file for complete search history.

(56) References Cited

U.S. PATENT DOCUMENTS

| | | |
|---|---|---|
| 5,467,434 A | 11/1995 | Hower et al. |
| 5,513,126 A | 4/1996 | Harkins et al. |
| 5,768,483 A | 6/1998 | Maniwa et al. |
| 5,845,076 A | 12/1998 | Arakawa |
| 5,875,350 A | 2/1999 | Comp et al. |
| 5,996,029 A | 11/1999 | Sugiyama et al. |
| 5,999,945 A | 12/1999 | Lahey et al. |
| 6,148,346 A | 11/2000 | Hanson |
| 6,351,320 B1 | 2/2002 | Shin |
| 6,421,135 B1 | 7/2002 | Fresk et al. |
| 6,789,111 B1 | 9/2004 | Brockway et al. |
| 6,825,941 B1 | 11/2004 | Nguyen et al. |
| 6,952,831 B1 | 10/2005 | Moore |
| 6,967,728 B1 | 11/2005 | Vidyanand |
| 6,975,820 B2 | 12/2005 | Wong |

(Continued)

FOREIGN PATENT DOCUMENTS

| | | |
|---|---|---|
| EP | 1 209 558 A2 | 5/2002 |
| GB | 2 347 766 | 9/2000 |

(Continued)

OTHER PUBLICATIONS

European Patent Office, "European Search Report", application No. EP 07250298, dated Feb. 23, 2010, 8 pages.

(Continued)

*Primary Examiner* — Thomas D Lee
*Assistant Examiner* — Stephen M Brinich
(74) *Attorney, Agent, or Firm* — Hickman Palermo Truong Becker Bingham Wong LLP; Edward A. Becker

(57) ABSTRACT

An approach is provided for automatically updating a printer driver for a printing device to reflect new features of the printing device or installing a printer driver for a newly available printing device. A client device sends a request to the printing device for a default print ticket. The client device also sends a request to the printing device for print capabilities data. Based on the print capabilities data and the default print ticket received from the printing device, a graphical user interface is generated, allowing a user to select, for a print job, print setting values for the one or more print settings supported by the printing device. Based on the print settings values selected by the user and the default print ticket, a print job ticket is generated for the print job and is sent to the printing device for processing.

20 Claims, 7 Drawing Sheets

U.S. PATENT DOCUMENTS

| | | | |
|---|---|---|---|
| 7,082,574 B2 | 7/2006 | Ogino et al. | |
| 7,136,941 B2 | 11/2006 | Nguyen | |
| 7,143,150 B1 | 11/2006 | Nuggehalli | |
| 7,162,518 B2 | 1/2007 | Takahashi | |
| 7,522,299 B2 | 4/2009 | Nguyen et al. | |
| 7,605,936 B2 * | 10/2009 | Uchida et al. | 358/1.15 |
| 7,633,403 B2 | 12/2009 | Abe et al. | |
| 7,728,999 B2 | 6/2010 | White et al. | |
| 7,809,807 B2 | 10/2010 | Tominaga | |
| 7,849,094 B2 | 12/2010 | Arai | |
| 8,099,486 B2 | 1/2012 | Nakamura et al. | |
| 8,149,431 B2 * | 4/2012 | Barton et al. | 358/1.13 |
| 8,243,294 B2 | 8/2012 | Herrmann et al. | |
| 2001/0050684 A1 | 12/2001 | Smith | |
| 2002/0030840 A1 | 3/2002 | Itaki et al. | |
| 2002/0054339 A1 | 5/2002 | Arakawa | |
| 2002/0078160 A1 | 6/2002 | Kemp et al. | |
| 2002/0120742 A1 | 8/2002 | Cherry | |
| 2002/0171857 A1 | 11/2002 | Hisatomi et al. | |
| 2002/0174444 A1 | 11/2002 | Gatto et al. | |
| 2003/0033368 A1 | 2/2003 | Tominaga | |
| 2003/0174357 A1 | 9/2003 | Lester et al. | |
| 2003/0184782 A1 | 10/2003 | Perkins et al. | |
| 2004/0111418 A1 | 6/2004 | Nguyen | |
| 2004/0179231 A1 | 9/2004 | Savino et al. | |
| 2004/0218201 A1 | 11/2004 | Lermant et al. | |
| 2004/0246505 A1 | 12/2004 | Oh | |
| 2004/0263900 A1 | 12/2004 | Nguyen et al. | |
| 2005/0030557 A1 | 2/2005 | Wiechers | |
| 2005/0030577 A1 | 2/2005 | Wiechers | |
| 2005/0043846 A1 | 2/2005 | Wiechers | |
| 2005/0046886 A1 | 3/2005 | Ferlitsch | |
| 2005/0099650 A1 | 5/2005 | Brown et al. | |
| 2005/0162688 A1 | 7/2005 | Nakoka et al. | |
| 2005/0180770 A1 | 8/2005 | Wong | |
| 2005/0210227 A1 | 9/2005 | Emerson | |
| 2005/0213136 A1 | 9/2005 | Noyama et al. | |
| 2005/0223390 A1 | 10/2005 | Moore | |
| 2005/0225795 A1 | 10/2005 | Nuggehalli et al. | |
| 2006/0023244 A1 | 2/2006 | Mitsui | |
| 2006/0029414 A1 | 2/2006 | Wong | |
| 2006/0114493 A1 | 6/2006 | Slightam | |
| 2006/0120349 A1 | 6/2006 | Taylor et al. | |
| 2006/0268328 A1 | 11/2006 | Park et al. | |
| 2007/0002355 A1 | 1/2007 | Kai | |
| 2007/0002368 A1 | 1/2007 | Corona | |
| 2007/0008560 A1 | 1/2007 | Eschbach | |
| 2007/0013935 A1 | 1/2007 | Uchida | |
| 2007/0052992 A1 | 3/2007 | Yamada | |
| 2007/0086023 A1 | 4/2007 | Kadota | |
| 2007/0097399 A1 | 5/2007 | Boyd et al. | |
| 2007/0136485 A1 | 6/2007 | Mitsui | |
| 2007/0174521 A1 | 7/2007 | Aritomi | |
| 2007/0214409 A1 | 9/2007 | Miyata | |
| 2007/0263242 A1 | 11/2007 | Takahashi | |
| 2008/0007742 A1 | 1/2008 | Abe et al. | |
| 2008/0059978 A1 | 3/2008 | Nishio | |
| 2008/0068635 A1 | 3/2008 | Asano | |
| 2008/0180728 A1 | 7/2008 | Sekine | |
| 2008/0192121 A1 | 8/2008 | Hashimoto | |
| 2008/0231886 A1 | 9/2008 | Wehner et al. | |
| 2008/0239373 A1 | 10/2008 | Suzuki | |
| 2008/0297838 A1 | 12/2008 | Matsui et al. | |
| 2008/0301277 A1 | 12/2008 | Tsujiguchi | |
| 2009/0040549 A1 | 2/2009 | Miyamoto | |
| 2009/0063710 A1 | 3/2009 | Sekine et al. | |
| 2009/0063718 A1 | 3/2009 | Sekine et al. | |
| 2009/0094539 A1 | 4/2009 | Wang et al. | |
| 2009/0190150 A1 | 7/2009 | Selvaraj | |
| 2010/0027040 A1 | 2/2010 | Kuroda | |
| 2010/0225933 A1 | 9/2010 | Xiao et al. | |
| 2010/0225957 A1 | 9/2010 | Liu et al. | |
| 2010/0225958 A1 | 9/2010 | Selvaraj et al. | |
| 2010/0225959 A1 | 9/2010 | Selvaraj et al. | |

FOREIGN PATENT DOCUMENTS

| | | |
|---|---|---|
| JP | 2002-014786 | 1/2002 |
| JP | 2002024495 A | 1/2002 |
| JP | 2003233482 A | 8/2003 |
| JP | 2005148953 A | 6/2005 |
| JP | 2005228148 A | 8/2005 |
| JP | 2007-034899 | 8/2007 |
| WO | WO 2004/070607 A1 | 8/2004 |

OTHER PUBLICATIONS

Device Driver. Wikipedia, the free encyclopedia. [retrieved on Sep. 8, 2008]. pp. 1-4. Retrieved from the Internet: <URL: http://en.wikipedia.org/wiki/Device_driver>.

Page Description Language. Wikipedia, the free encyclopedia. [retrieved on Sep. 8, 2008]. pp. 1. Retrieved from the Internet: <URL: http://en.wikipedia.org/wiki/Page_description_language>.

European Patent Office, "European Search Report", application No. 08163180.6-2211, dated Nov. 11, 2008, 10 pages.

Katayama et al., "Prototype of the device driver generation system for unix-like operating systems", Principles of Software Evolution, 2000, XP 010537526, 10 pages.

Katayama et al., "Proposal of a support system for device driver generation", Software Engineering conference, 1999, APSEC 1999 proceedings, XP010363982, 4 pages.

Sweet, Michael, "An Overview of the Commom UNIX Printing System", Easy Software Products, XP002501773, Jul. 2000, 8 pages.

Shaojie, Wang, et al., "Synthesizing operating system based device drivers in embedded systems", International Conference on Hardware/Software Codesign and system Synthesis, Oct. 2003, XP010688137, 8 pages.

European Patent Office, "European Search Report", application No. EP 08163260, dated Dec. 15, 2008, 9 pages.

Systems Inc., "PostScript Printer Description File Format Specification 4.3—Chapters 1 & 2", Internet Citation, XP002158174, retrieved from http://partners.adobe.com/asn/developer/pdfs/tn/5003.ppd_spec_v4.3.pdf, 18 pages.

European Patent Office, "European Search Report", application No. EP 09151185, dated May 11, 2009, 8 pages.

* cited by examiner

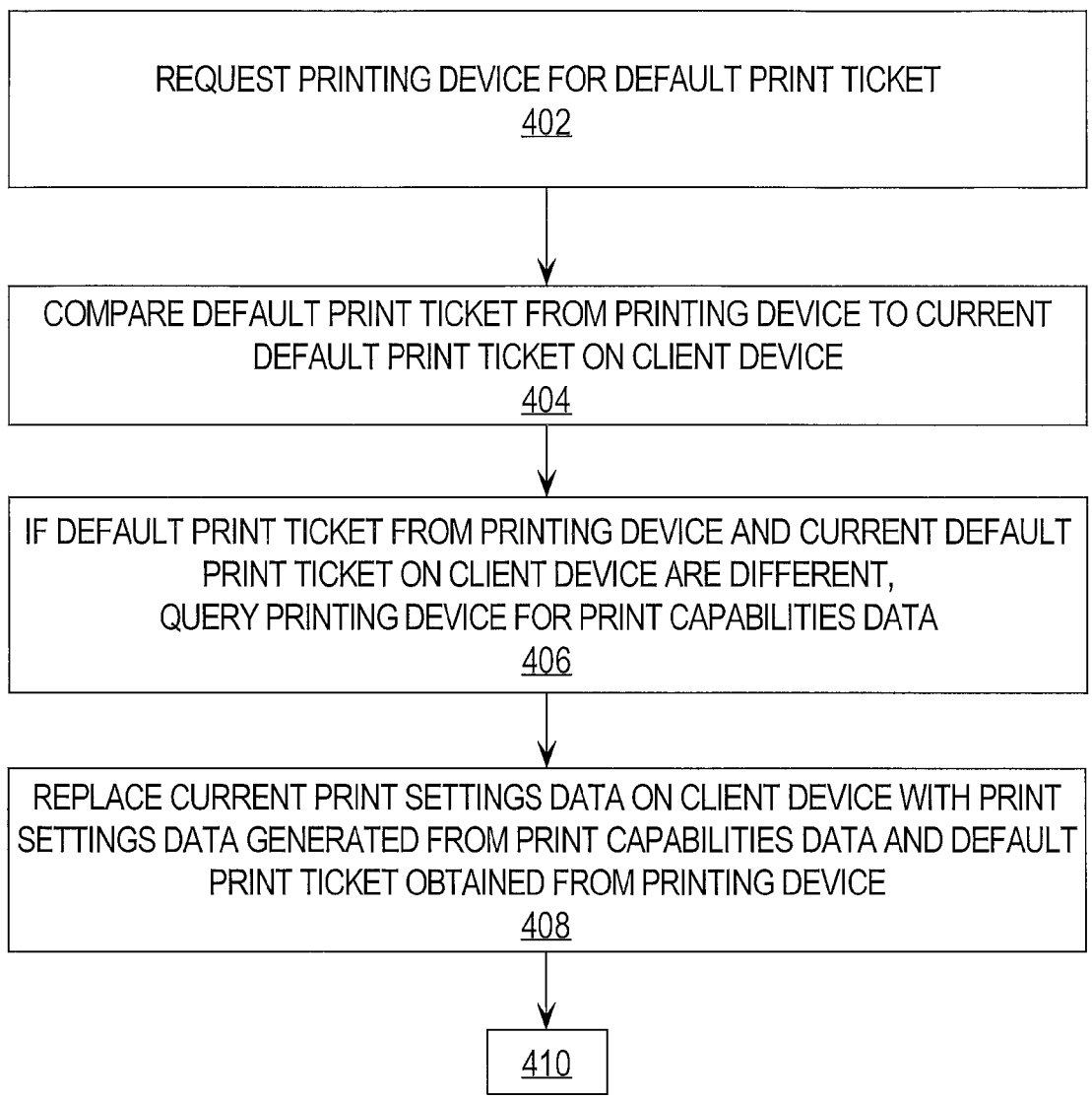

AUTOMATICALLY UPDATING A PRINTER DRIVER WITH NEW PRINTING DEVICE FEATURES

FIELD OF THE INVENTION

The present invention relates generally to printing systems and printer drivers.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

When a client device, such as a PC, prints to a printing device, such as a printer, a print subsystem on the client device processes print data generated by an application program on the client device, converts the print data into a format supported by the printing device, and sends the converted print data to the printing device, which then prints the print data. For example, a user creates an electronic document using a word processing application on a PC. The user then selects a print option in the word processing application to request that the electronic document be printed to a particular printer. The print subsystem on the PC processes this request by processing the print data for the electronic document, converting the print data into a format supported by the particular printer, and sends the converted print data to the particular printer. Generally, converted print data is sent to a printing device as part of a print job that is recognized by the printing device.

To perform these steps, which result in the printing device processing the submitted print job, the print subsystem on the client device usually makes use of a printer driver, which includes processes that process print data generated by an application program and convert the print data into a format supported by the printing device. Conventionally, printer drivers are specific to each printing device. That is, each printer driver converts print data into a format supported by a particular printing device. Therefore, in order for a client device to print to a particular printing device, the client device must have installed on it the printer driver for the particular printing device.

Flow diagram 100 in FIG. 1 illustrates one approach for utilizing a printer driver to print to a particular printing device. In step 102, a manufacturer-provided printer driver is installed on a client device. The installation is usually performed by a user of the client device. The printer driver includes print settings data and a default print ticket for the particular printing device. Print settings data contains information about the print settings that are supported by the particular printing device, the available print setting values for the print settings, and the default print setting values for the print settings. For example, a print setting supported by the particular printing device may be the type of printing, for which the available print setting values may be "BW" (i.e. black-and-white printing) and "COLOR" (i.e. color printing), where "BW" is the default print settings value. A default print ticket is a print job ticket that is in a format that is supported by the particular printer and that also indicates default setting values for the print settings supported by the particular printing device. Based on the print settings data, a user interface is generated (step 104), where the user may select desired print setting values for a print job. The user selections are captured and saved as print settings selections data (step 106). The print settings selections data and the default print ticket are both used in generating a print job ticket for the print job (step 108). The generated print job ticket is in the format supported by the particular printing device and also incorporates the print settings value selections received from the user. The print job ticket is submitted to the printing device for processing and printing (step 110). Print data for the print job, which is in a format that is supported by the particular printing device, is generated from data output by an application on the client device. Print data may be submitted along with the print job ticket as part of a same print job that is to be processed by the printing device (not depicted in flow diagram 100).

When a printing device is updated with a new feature that is reflected in a new print setting, or when a new printing device becomes available for printing to the client device, however, new or updated printer drivers must be installed on the client device in order for the client device to print to the new or updated printing device. Flow diagram 200 in FIG. 2 illustrates a series of steps that are typically performed to enable a client device to print to a new or updated printing device. First, the manufacturer of the new or updated printing device creates or updates the printer driver for the printing device by creating or updating the print settings data and the default print ticket for the printer driver (step 202). In the case where the printer driver is updated, the print settings data and the default print ticket are updated to reflect the new feature(s) on the printing device. Next, the manufacturer releases the new or updated printer driver (step 204), which may include storing the printer driver on removable storage media (e.g., CD-ROM, DVD-ROM, etc.) and delivering the storage media to the user (e.g., sending a CD-ROM through the mail to the user's postal address) or making the printer driver available for download on the manufacturer's web site. Once the user has obtained the new or updated printer driver, he or she installs the new or updated printer driver (including the new or updated print settings data and default print ticket) on the operation system of the client device (step 208). If the user is not installing a new printer driver, but is updating an old printer driver, he or she may also need to remove the old printer driver from the client device's operating system (step 206). Finally, after the installation of the new or updated printer driver, the new or updated printer driver, including the new or updated print settings data and default print ticket, is available for use for generating user interfaces and print job tickets that reflect the new printer or new feature (step 210).

The approach just described is inefficient and tedious, requiring the manufacturer to update the printer driver and to make it available to the user and requiring the user to obtain the updated printer driver and to install the updated printer driver on the client device.

Based on the foregoing, there is a need for an approach for efficiently installing new printer drivers and updating existing printer drivers on client devices.

SUMMARY

An approach is provided for automatically updating a printer driver for a printing device to reflect new features of the printing device or installing a printer driver for a newly available printing device. A client device sends a request to the printing device for a default print ticket. A default print ticket indicates a default print setting value for each of one or more print settings supported by the printing device. The client device also sends a request to the printing device for print capabilities data. The print capabilities data indicates one or more print settings supported by the printing device as well as the available print setting values for the one or more print settings supported by the printing device. The client device receives, from the printing device, the default print ticket and the print capabilities data. Based on the print capabilities data and the default print ticket, a graphical user interface is generated, allowing a user to select, for a print job, print setting values for the one or more print settings supported by the printing device. The user selections, as received by the graphical user interface, are saved as print settings selections data. Based on the print settings selections data and the default print ticket, a print job ticket is generated for the print job and is sent to the printing device for processing.

According to one embodiment, the requests for default print ticket and print capabilities data are sent in response to a particular event. The particular event may be receipt of user input indicating that the user wishes to send the requests, a preset amount of time having passed since the last time the requests are sent, or receipt of notification from the printing device that an updated default print ticket and updated print capabilities data are available.

According to one embodiment, when a default print ticket is received from the printing device, the default print ticket is compared to another, older default print ticket that is already stored on the client device. In this embodiment, the step of sending a request to the printing device for the print capabilities data is performed only if it is determined that the default print ticket is different from the older default print ticket.

According to one embodiment, the printing device is a Web Service-enabled printing device.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 4A and 4B depict a flow diagram that illustrates an approach for efficiently installing new printer drivers and updating existing printer drivers on client devices for printing to printing devices with the new or updated printer drivers.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

I. OVERVIEW
II. ARCHITECTURE FOR AUTOMATICALLY UPDATING PRINT DRIVERS TO INCLUDE NEW FEATURES
III. RETRIEVING UPDATED PRINTER DRIVER INFORMATION FROM A PRINTING DEVICE
IV. GENERATING A USER INTERFACE BASED ON UPDATED PRINTER DRIVER INFORMATION
V. GENERATING A PRINT JOB TICKET BASED ON UPDATED PRINTER DRIVER INFORMATION
VI. IMPLEMENTATION MECHANISMS

I. Overview

An approach is provided for automatically updating a printer driver for a printing device to reflect new features of the printing device or installing a printer driver for a newly available printing device. A client device sends a request to the printing device for a default print ticket. A default print ticket indicates a default setting value for each or one or more print settings supported by the printing device. The client device also sends a request to the printing device for print capabilities data. The print capabilities data indicates one or more print settings supported by the printing device as well as the available print setting values for the one or more print settings supported by the printing device. The client device receives, from the printing device, the default print ticket and the print capabilities data. Based on the print capabilities data and the default print ticket, a graphical user interface is generated, allowing a user to select, for a print job, print setting values for the one or more print settings supported by the printing device. The user selections, as received by the graphical user interface, are saved as print settings selections data. Based on the print settings selections data and the default print ticket, a print job ticket is generated for the print job and is sent to the printing device for processing.

Figure 3:
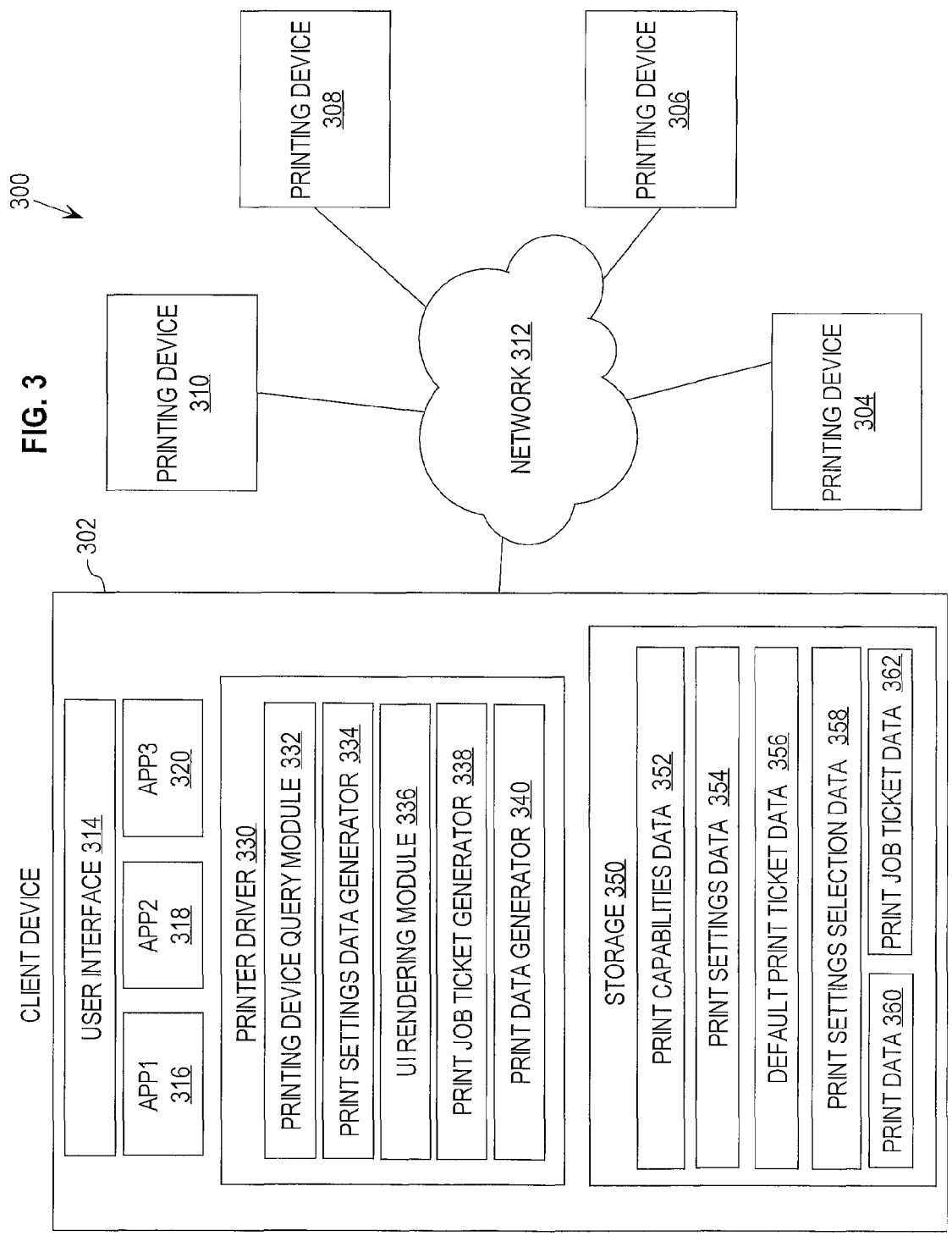
FIG. 3 is a block diagram that depicts an example arrangement in which a printing system may be implemented, according to an embodiment of the invention.

II. Architecture for Automatically Updating Print Drivers to Include New Features FIG. 3 is a block diagram that depicts an example arrangement 300 in which a printing system may be implemented, according to an embodiment of the invention. Arrangement 300 includes a client device 302 and printing devices 304, 306, 308, and 330 that are communicatively coupled to each other via a network 312. Network 312 may be implemented by any medium or mechanism that provides for the exchange of data between the various elements depicted in FIG. 3. Examples of network 312 include, without limitation, a network such as a Local Area Network (LAN), Wide Area Network (WAN), Ethernet or the Internet, or one or more terrestrial, satellite or wireless links. Network 312 may also provide secure communications between the various elements depicted in FIG. 3. The various elements depicted in FIG. 3 may also communicate with each other via one or more direct communications links that are not depicted in FIG. 3 or described herein for purposes of brevity.

Client device 302 may be any type of client device and the invention is not limited to any particular type of client device. Examples of client device 302 include, without limitation, a desktop computer, a laptop computer, a personal digital assistant (PDA), a mobile device and a telephony device. In the present example, client device 302 includes a user interface 314, applications APP1 316, APP2 318, and APP3 320, printer driver 330, and storage 350.

Printing devices 304, 306, 308, 310 may be any type of device that is capable of processing print data and generating a printed version of an electronic document reflected in the print data. Examples of printing devices 304, 306, 308, 310 include, without limitation, printers, network-enabled copy machines and multi-function peripherals (MFPs), and the approaches described herein are not limited to any particular type of printing devices 304, 306, 308, 310. Embodiments of the invention are described herein in the context of four printing devices depicted in FIG. 3, but the approach is applicable to any number of printing devices disposed in the same or different physical locations. Client device 302 may provide print data to printing devices 304, 306, 308, 310 in any format and according to any communications protocol, depending upon a particular implementation. For example, LPR (Line Printer Daemon), SMB, Apple Talk, DLC, TCP/IP and SNMP may be used.

User interface 314 may be implemented by any mechanism(s) and/or process(es) that allow for the exchange of information between client device 302 and users. Examples of user interface 314 include, without limitation, a display, such as a cathode ray tube (CRT) or liquid crystal display (LCD), and an input device, such as a keypad, touchpad, touch screen, keyboard or mouse, or any combination of displays and input devices.

Applications APP1 316, APP2 318, and APP3 320 may be any type of applications that are capable of generating print data. Examples of applications APP1 316, APP2 318, and APP3 320 include, without limitation, a word processing program, a spreadsheet program, an email program or any other type of application.

Printer driver 330 may be implemented in computer software, computer hardware, or any combination of computer hardware and software. For example, printer driver 330 may be implemented as one or more software processes executing on client device 302. As another example, printer driver 330 may be implemented as executable code installed on client device 302. According to one embodiment of the invention, printer driver 330 includes a printing device query module 332, a print settings data generator 334, a UI rendering module 336, a print job ticket generator 338, and a print data generator 340. Printer driver 330 may include other modules, elements and functionality not depicted in FIG. 3 or described herein for purposes of brevity, and the invention is not limited to printer driver 330 having any particular combination of modules and functionality. Printing device query module 332 requests and receives, from printing devices 304, 306, 308, and 310 default print tickets and print capabilities data. Print settings data generator 334 generates, based on default print tickets and print capabilities data, print settings data. UI rendering module 336 generates user interface 314 based on the print settings data generated by print settings data generator 334. Print job ticket generator 338 generates, based on print settings data and user input received through user interface 314, print job tickets for submission to printing devices 304, 306, 308, and 310. Print data generator 340 generates print data for submission to printing devices 304, 306, 308, and 310 based on application data generated by applications APP1 316, APP2 318, and APP3 320.

Storage 350 may be implemented by any type of storage. Examples of storage 350 include, without limitation, volatile memory, such as random access memory (RAM) and non-volatile storage, such as one or more disks or flash memory. Client device 302 may include other mechanisms, modules, processes, etc., depending upon a particular implementation that are not depicted in FIG. 3 or described herein for purposes of explanation. In FIG. 3, storage 350 is depicted as storing print capabilities data 352, print settings data 354, default print ticket data 356, print settings selection data 358, print data 360, and print job ticket data 362. Print capabilities data 352 indicates one or more print settings supported by one or more printing devices, as well as the available print setting values for the one or more print settings supported by the one or more printing devices. Default print ticket data 356 includes one or more default print tickets for one or more printing devices, where each default print ticket indicates default setting values for the print settings supported by a printing device. Storage 350 may also include various other types of data that are not depicted in FIG. 3.

III. Retrieving Updated Printer Driver Information From a Printing Device

Figure 4B:
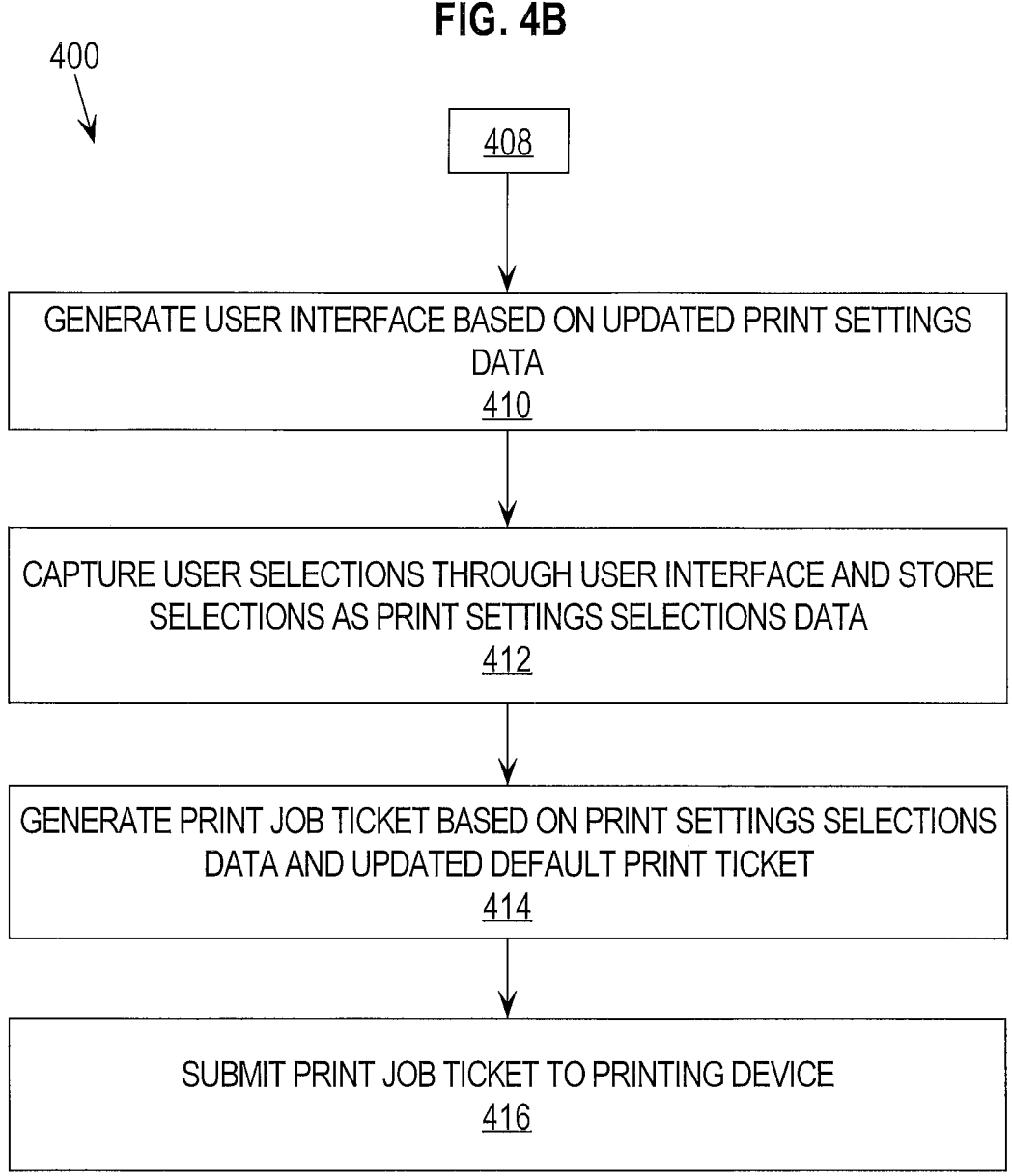

FIG. 4A illustrates a flow diagram 400 that depicts an approach for efficiently installing new printer drivers and updating existing printer drivers on client devices for printing to printing devices with the new or updated printer drivers. Steps 402, 404, 406, and 408 illustrate steps for retrieving new or updated printer driver information from a printing device, and are described below with reference to the devices depicted in system 300 in FIG. 3.

In step 402, client device 302 sends a request to a printing device for a default print ticket. The printing device may be printing device 304, 306, 308, or 310. For purposes of illustration, in this example the client device 302 sends a request to printing device 304 for a default print ticket. A default print ticket is a print job ticket that is in a format that is supported by a particular printer and that also indicates default setting values for the print settings supported by the particular printing device. As such, each printing device may be associated with a different default print ticket. In response to receiving the request from the client device 302, printing device 304 sends its default print ticket to client device 302. The default print ticket from printing device 304 may be stored as default print ticket data 356 in storage 350. If and when default print tickets are received from other printing devices, the default print tickets may be stored separately and in a manner such that each stored default print ticket is identified with the printing device with which the default print ticket is associated. In one embodiment, the step of retrieving the default print ticket from a particular printing device, including sending a request to the particular printing device and receiving the requested default print ticket from the particular printing device, is performed by printing device query module 332 in printer driver 330 on client device 302.

In step 404, the retrieved default print ticket is compared with the default print ticket associated with printing device 304 that was previously stored on client device 302 to determine whether the retrieved default print ticket is different from the previously-stored default print ticket. If the two default print tickets are different, then the retrieved default print ticket replaces the previously stored default print ticket as the default print ticket to be used by printer driver 330 and any other components of the print subsystem on client device 302 in printing to printing device 304. If the two default print tickets are the same, however, then no replacement need take place, and client device 302 may also cease any further requests to printing device 304 for further printer driver information. In an embodiment where printing device 304 is newly available to client device 302, then no default print ticket associated with printing device has previously been stored on client device 302. In this embodiment, the retrieved default print ticket may automatically be used as the default print ticket for printing to printing device 304.

In step 406, client device 302 sends a request to a printing device for print capabilities data. In one embodiment, this step is performed only if it has been determined that the retrieved default print ticket is different from the default print ticket associated with printing device 304 that was previously stored on client device 302, or if there is no default print ticket associated with printing device 304 that was previously stored on client device 302. Since the default print ticket 356 indicates default setting values for the print settings supported by printing device 304, a change in the print settings of printing device 304 will most likely result in a change to the default print ticket. Therefore, the step of sending a request to printing device 304 for updated print capabilities data may be performed after determining that the default print ticket has changed.

However, some changes to printing device 304's print capabilities data may not be reflected in the default print ticket. For example, a print setting for a printing device may be printer resolution, which may initially support values of 300 dpi and 600 dpi, where the default setting value is 300 dpi. In this example, when printing device 304 is updated to include an additional setting value of 900 dpi for the printer resolution print setting, the default print ticket will not change. In an alternative embodiment, step 406 is performed regardless of any differences between the retrieved default print ticket and default print ticket associated with printing device 304 that was previously stored on client device 302 in default print ticket data 356.

The print capabilities data of a printing device indicate one or more print settings supported by the printing device as well as the available print setting values for the one or more print settings supported by the printing device. As such, each printing device may be associated with different print capabilities data. In response to receiving a request for print capabilities data from the client device 302, printing device 304 sends its print capabilities data to client device 302. The print capabilities data from printing device 304 may be stored as print capabilities data 352 in storage 350. If and when print capabilities data are received from other printing devices, the different sets of print capabilities data may be stored separately and in a manner such that each stored set of print capabilities data is identified with the printing device with which the print capabilities data is associated. In one embodiment, the step of retrieving the print capabilities data from a particular printing device, including sending a request to the particular printing device and receiving the requested print capabilities data from the particular printing device, is performed by printing device query module 332 in printer driver 330 on client device 302.

Based on print capabilities data 352 and default print ticket 356, a set of print settings data is generated and stored as print settings data 354. Print settings data 354 contains information about the print settings that are supported by the particular printing device, the available setting values for the print settings, as well as the default setting values for the print settings. For example, a print setting supported by the particular printing device may be the type of printing, for which the available values may be "BW" (i.e. black-and-white printing) and "COLOR" (i.e. color printing), where "BW" is the default settings value. As such, each printing device may be associated with different print settings data.

In one embodiment, the step of generating the print settings data for a particular printing device based on the default print ticket and the print capabilities data for the particular device is performed by print settings data generator 334 in printer driver 330 on client device 302. The generated print capabilities data may be stored as print settings data 354 in storage 350. If and when print settings data are generated for other printing devices, different sets of print settings data may be stored separately and in a manner such that each stored set of print settings data is identified with the printing device with which the print settings data is associated. In addition, the generated print settings data 354 may replace any other print settings data previously generated and stored on client device 302 for printing device 304. In one embodiment, print settings data 354 is in the format of a Generic Printer Description ("GPD") file format.

Step 402, in which client device 302 sends an initial request to printing device 304 for updated device information (e.g., default print ticket), may be initiated in various ways. Various approaches for initiating step 302 includes, but are not limited to: performing step 402 in response to a user request, performing step 402 periodically so that step 402 is performed after a fixed amount of time has elapsed since the last time step 402 was performed, performing step 402 in response to detection that a new printing device has become available to client device 302, and performing step 402 in response to receiving a notice event from an already-available printing device that indicates that there is updated printer driver information (e.g., default print ticket and print capabilities data) on the already-available printing device.

IV. Generating a User Interface Based on Updated Printer Driver Information

When a user wishes to print data from an application, such as applications APP1 316, APP2 318, or APP3 320, he or she enters a "print" command (e.g., selecting "print" from a drop-down menu on the application's user interface), in response to which a user interface 314 is generated. User interface 314 is a user interface for printing a particular print job, through which a user can view the available printers and available print settings of the available printers, and through which the user may select a printer and select print settings value for the selected printer's print settings.

Figure 1:
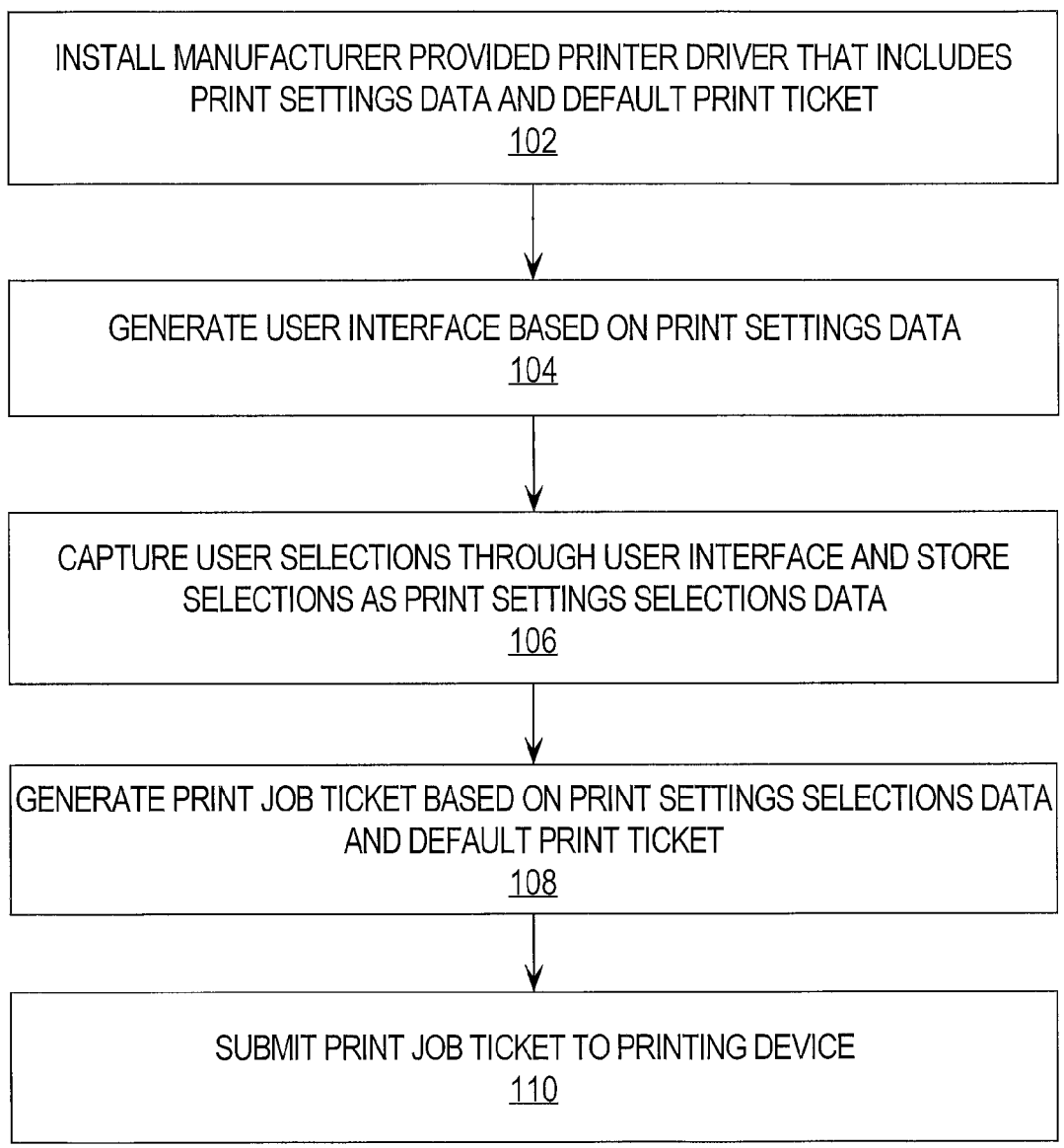
FIG. 1 depicts a flow diagram that illustrates one approach for utilizing a printer driver to print to a particular printing device.
Figure 2:
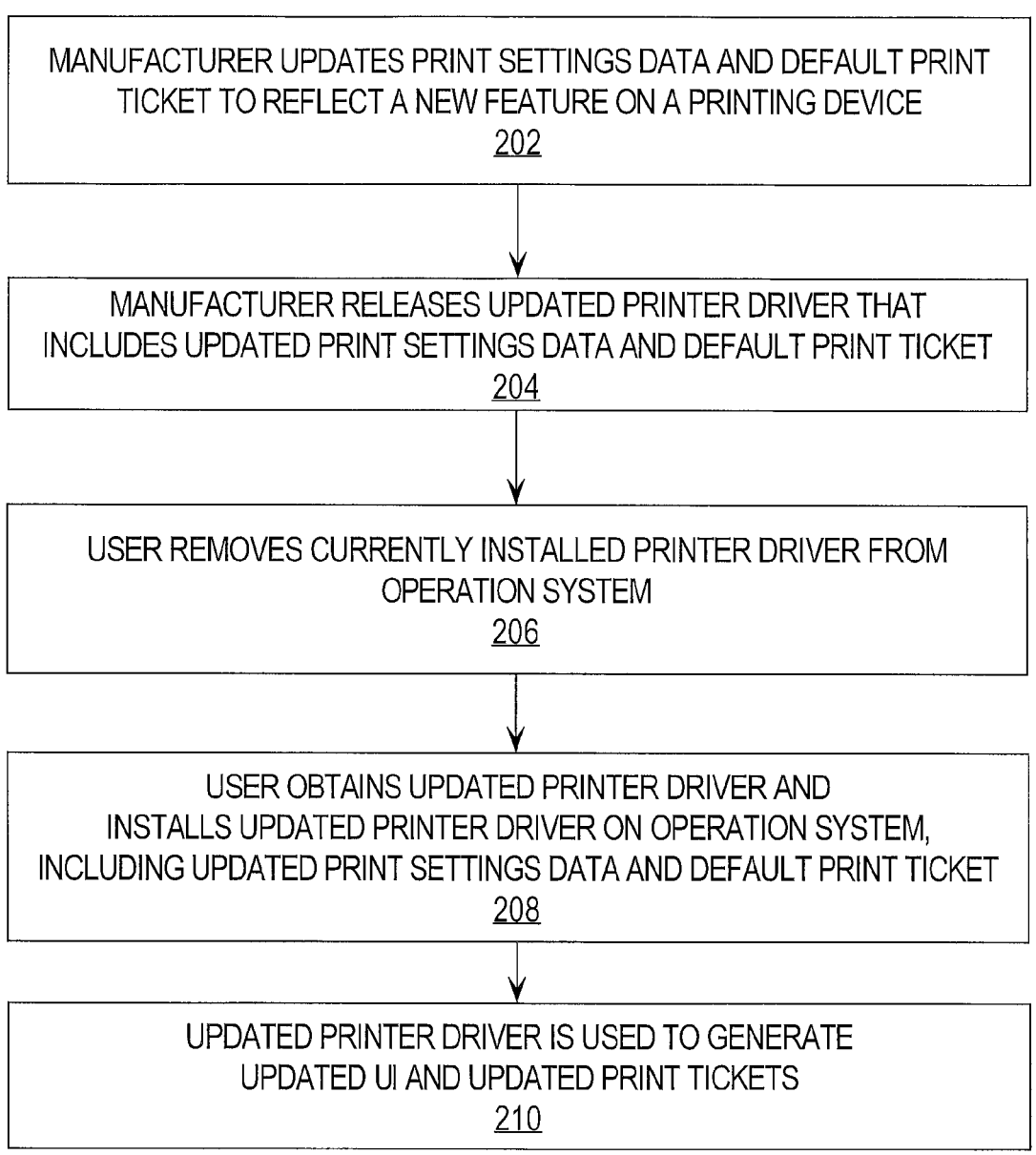
FIG. 2 depicts a flow diagram that illustrates a series of steps that are typically performed to enable a client device to print to a new or updated printing device.

As discussed above with respect to step 204 in flow diagram 200 in FIG. 2, user interface 314 may be generated based on print settings data. In step 410 in FIG. 4B, user interface 314 is generated based on the updated or new print settings data generated in step 408.

Figure 5:
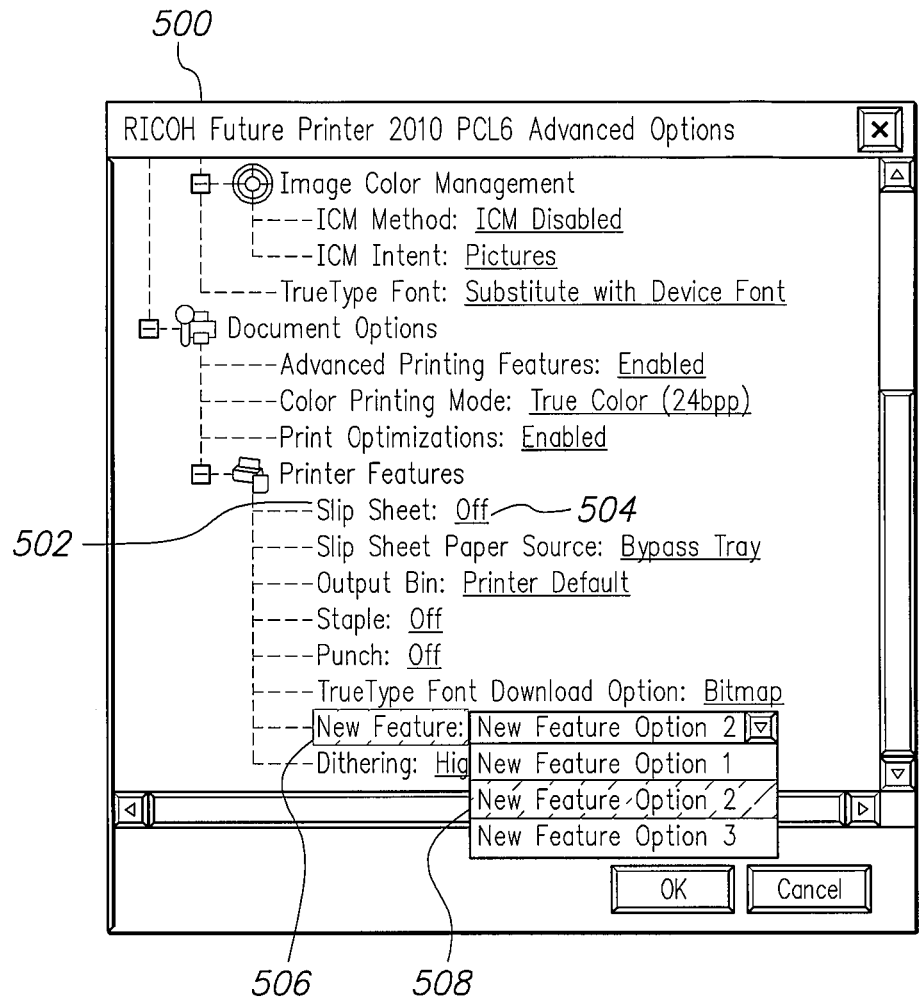
FIG. 5 depicts an example user interface screen that displays a printer's print settings and print settings value to a user and that allows the user to select print settings values.

FIG. 5 is an example user interface screen 500 that displays a printer's print settings and print settings value to a user and that allows the user to select print settings values. User interface screen 500 illustrates the printer's print settings include print setting 502 ("Slip Sheet") and print setting 506 ("New Feature"). For print setting 502 ("Slip Sheet"), the currently selected print setting value 504 is "Off". For print setting 506 ("New Feature"), a drop-down menu lists the available print setting values 508 (i.e., "New Feature Option 1", "New Feature Option 2", and "New Feature Option 3"). When user interface 500 is generated, user interface 500 may display, for each print setting, a default print setting value. The user may then select print setting values for one or more print settings.

In step 412, user selections in user interface 500 are captured and stored as print settings selections data 358 in storage 350. In one embodiment, print settings selections data 358 is stored as a DEVMODE structure.

V. Generating a Print Job Ticket Based on Updated Printer Driver Information

In step 414, a print job ticket is generated based on print settings selections data 358 and default print ticket data 356. The generated print job ticket is in the format supported by the particular printing device. The generated print job ticket is generated for a particular print job, and incorporates the print settings values selected by the user through user interface 500. To the extent that any of the print settings of the printer to which the print job is to be submitted (e.g., printing device 304) do not have any of its print settings values selected by the user, the print job ticket may use the default print settings values included in default print job ticket data 356 for the particular printing device.

In one embodiment, the print job ticket is generated by print job ticket generator 338. The print job ticket generator 338 may generate the print job ticket by making a copy of a default print ticket from default print ticket data 356 and then modifying the copy of the default print ticket to incorporate any print settings values selected by the user that alter the default print settings values included in the default print ticket.

In step 416, the print job ticket is submitted to the printer (e.g., printing device 304) for printing.

In one embodiment, print data generator 340 generates print data 360 from application data output by the application from which the user initiated the print job. Application data output by an application may be in one of any number of formats. However, print data to be processed by a particular printing device must be in a format supported by the particular printing device. Print data generator 340 generates print data 360, which is in a format supported by the printing device for the print job (e.g., printing device 304), based on application data.

The print job ticket and print data 360 are submitted to the printing device selected for the print job in a manner that is supported by the printing device. In one embodiment, the print job ticket and print data 360 may be combined into a single file for submission to the printing device. In another embodiment, the print job ticket and print data 360 are submitted as separate files to the printing device. In one embodiment, where the printing device is a Web Service-enabled printing device, the print job ticket and print data 360 are submitted according to a print job submission protocol supported by the Web Service-enabled printing device.

VI. Implementation Mechanisms

According to one embodiment of the invention, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
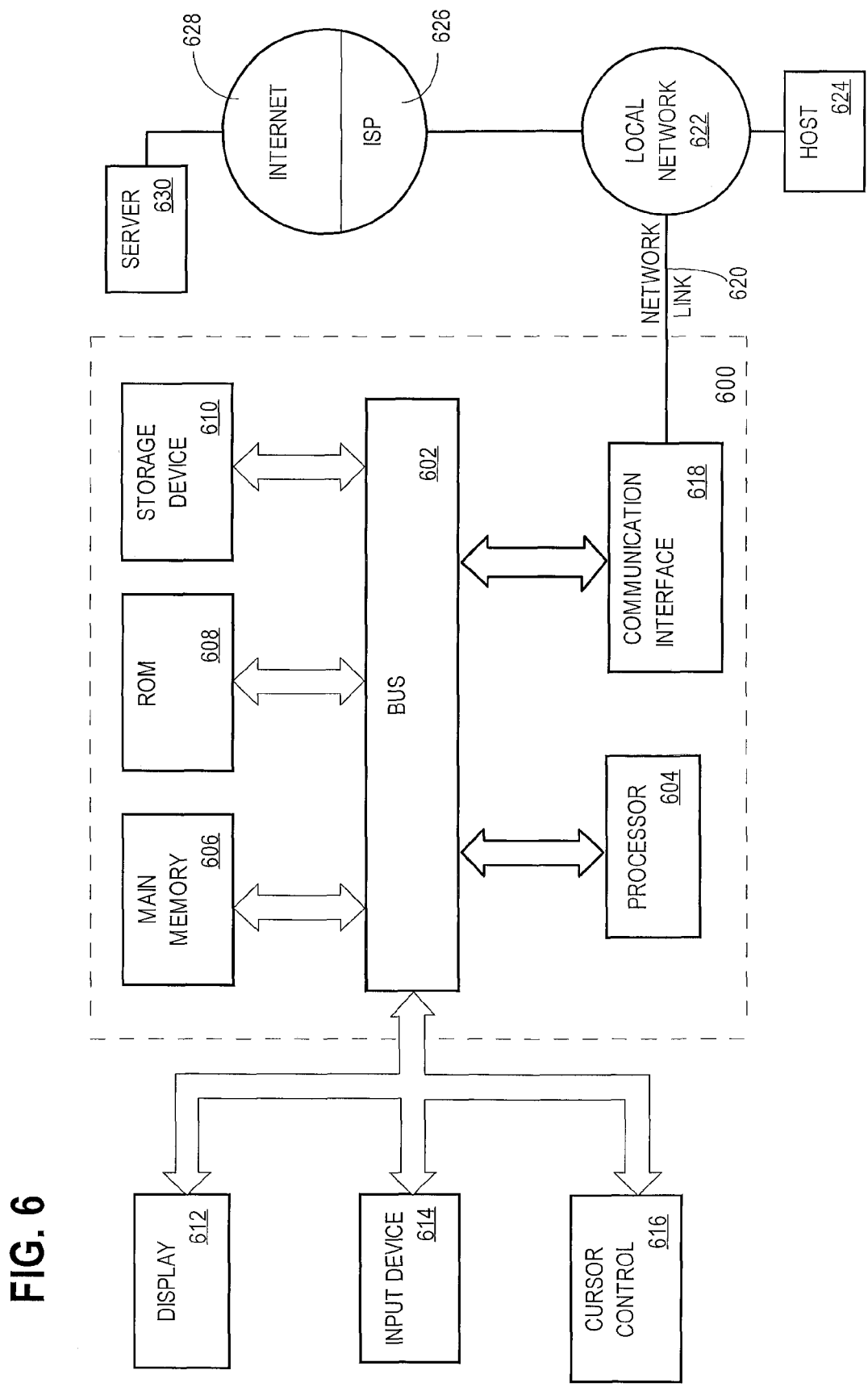
FIG. 6 is a block diagram of a computer system on which embodiments of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic or computer software which, in combination with the computer system, causes or programs computer system 600 to be a special-purpose machine. According to one embodiment of the invention, those techniques are performed by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a computer to operation in a specific fashion. In an embodiment implemented using computer system 600, various computer-readable media are involved, for example, in providing instructions to processor 604 for execution. Such a medium may take many forms, including but not limited to, non-volatile media and volatile media. Non-volatile media includes, for example, optical or magnetic disks, such as storage device 610. Volatile media includes dynamic memory, such as main memory 606.

Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of computer-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for printing to a printing device, comprising:
    sending a request for a default print ticket to the printing device;
    receiving, from the printing device, a default print ticket, wherein the default print ticket indicates a default setting value for each of one or more print settings supported by the printing device;
    sending a request for print capabilities data to the printing device;
    receiving, from the printing device, print capabilities data, wherein the print capabilities data indicates the one or more print settings supported by the printing device and available setting values for the one or more print settings supported by the printing device;
    based on the print capabilities data and the default print ticket, generating print settings data, wherein:
        a user interface for a print job is generated based on the print settings data;
        the print settings data and the user interface each indicates the one or more print setting supported by the printing device, the available setting values for the one or more print settings supported by the printing device, and the default setting value for one or more print setting supported by the printing device;
        user input received through the user interface is stored as print settings selections data; and
        the print settings selections data indicates one or more user-selected settings values for one or more print settings supported by the printing device;
    based on the default print ticket and the print settings selections data, generating a print job ticket for the print job; and
    sending the print job ticket to the printing device.

2. The computer-implemented method as recited in claim 1, wherein the step of sending a request for a default print ticket to the printing device is performed in response to having detected an event.

3. The computer-implemented method as recited in claim 2, wherein the event is receipt of a user input.

4. The computer-implemented method as recited in claim 2, wherein the event is detection that a specific amount of time has elapsed.

5. The computer-implemented method as recited in claim 1, further comprising:
    comparing the default print ticket received from the printing device to another default print ticket;
    determining whether the default print ticket is different from the other default print ticket; and
    wherein the steps of sending a request for print capabilities data, receiving print capabilities data, and generating print settings data are performed in response to determining that the default print ticket received from the printing device is different from the other default print ticket.

6. The computer-implemented method as recited in claim 1, wherein the print selections data is a DEVMODE data structure.

7. The computer-implemented method as recited in claim 1, wherein the print capabilities data is contained in an XML file.

8. The computer-implemented method as recited in claim 1, wherein the printing device is a Web Service-enabled printing device.

9. The computer-implemented method as recited in claim 1, wherein the print settings data is a GPD (Generic Printer Description) file.

10. A client device, comprising:
    storage;
    a user interface;
    a printing device query module configured to:
        send a request for a default print ticket to a printing device,
        receive, from the printing device, a default print ticket, wherein the default print ticket indicates a default setting value for each of one or more print settings supported by the printing device,
        send a request for print capabilities data to the printing device,
        receive, from the printing device, print capabilities data, wherein the print capabilities data indicates the one or more print settings supported by the printing device and available setting values for the one or more print settings supported by the printing device; and
    a print driver configured to:
        generate print settings data based on the print capabilities data and the default print ticket, wherein, the print settings data and the user interface each indicates the one or more print setting supported by the printing device, the available setting values for the one or more print settings supported by the printing device, and the default setting value for one or more print setting supported by the printing device, cause user input received through the user interface to be stored on the storage as print settings selections data, the print settings selections data indicates one or more user-selected settings values for one or more print settings supported by the printing device, generate a print job ticket for the print job based on the default print ticket and the print settings selections data, and cause the print job ticket to be sent to the printing device.

11. The client device as recited in claim 10, wherein the printing device query module is further configured to send the request for a default print ticket to the printing device in response to having detected an event.

12. The client device as recited in claim 11, wherein the event is receipt of a user input.

13. The client device as recited in claim 11, wherein the event is detection that a specific amount of time has elapsed.

14. The client device as recited in claim 10, wherein:
the print driver is further configured to:
compare the default print ticket received from the printing device to another default print ticket,
determine whether the default print ticket is different from the other default print ticket, and
wherein the sending a request for print capabilities data, receiving print capabilities data, and generating print settings data are performed in response to determining that the default print ticket received from the printing device is different from the other default print ticket.

15. The client device as recited in claim 10, wherein the print settings data is a GPD (Generic Printer Description) file.

16. The client device as recited in claim 10, wherein the print selections data is a DEVMODE data structure.

17. The client device as recited in claim 10, wherein the print capabilities data is contained in an XML file.

18. The client device as recited in claim 10, wherein the printing device is a Web Service-enabled printing device.

19. A non-transitory computer-readable medium for printing to a printing device, the non-transitory computer-readable medium storing instructions which, when processed by one or more processors, cause:

sending a request for a default print ticket to the printing device;

receiving, from the printing device, a default print ticket, wherein the default print ticket indicates a default setting value for each of one or more print settings supported by the printing device;

sending a request for print capabilities data to the printing device;

receiving, from the printing device, print capabilities data, wherein the print capabilities data indicates the one or more print settings supported by the printing device and available setting values for the one or more print settings supported by the printing device;

based on the print capabilities data and the default print ticket, generating print settings data, wherein:
a user interface for a print job is generated based on the print settings data;
the print settings data and the user interface each indicates the one or more print setting supported by the printing device, the available setting values for the one or more print settings supported by the printing device, and the default setting value for one or more print setting supported by the printing device;
user input received through the user interface is stored as print settings selections data; and
the print settings selections data indicates one or more user-selected settings values for one or more print settings supported by the printing device;

based on the default print ticket and the print settings selections data, generating a print job ticket for the print job; and sending the print job ticket to the printing device.

20. The non-transitory computer-readable medium as recited in claim 19, further storing additional instructions which, when processed by the one or more processors, causes:

comparing the default print ticket received from the printing device to another default print ticket;

determining whether the default print ticket is different from the other default print ticket; and wherein the steps of sending a request for print capabilities data, receiving print capabilities data, and generating print settings data are performed in response to determining that the default print ticket received from the printing device is different from the other default print ticket.

* * * * *